United States Patent [19]

Chan et al.

[11] Patent Number: 4,829,319

[45] Date of Patent: May 9, 1989

[54] PLASTIC ORIFICE PLATE FOR AN INK JET PRINTHEAD AND METHOD OF MANUFACTURE

[75] Inventors: C. S. Chan, Boise, Id.; Wesley L. Meyer, Eugene; Kenneth E. Trueba, Corvallis, both of Oreg.

[73] Assignee: Hewlett-Packard Company, Palo Alto, Calif.

[21] Appl. No.: 120,298

[22] Filed: Nov. 13, 1987

[51] Int. Cl.[4] .......... G01D 15/18

[52] U.S. Cl. .......... 346/1.1; 346/140 R; 204/6; 264/156

[58] Field of Search .......... 346/146, 75, 1.1; 204/11, 6; 264/156

[56] References Cited

U.S. PATENT DOCUMENTS

| | | | |
|---|---|---|---|
| 2,533,609 | 12/1950 | Nolan | 264/156 |
| 3,719,736 | 3/1973 | Woodruff | 264/156 |
| 4,132,519 | 1/1979 | Reed | 264/156 X |
| 4,211,617 | 7/1980 | Hunyar | 204/6 X |
| 4,312,009 | 1/1982 | Lange | 346/140 |
| 4,330,787 | 5/1982 | Sato | 346/140 |
| 4,490,728 | 12/1984 | Vaught | 346/140 X |
| 4,611,219 | 9/1986 | Sugitani | 346/140 |
| 4,623,904 | 11/1986 | Conta | 346/140 |
| 4,675,083 | 6/1987 | Bearss | 204/11 |
| 4,694,308 | 9/1987 | Chan | 346/140 |

*Primary Examiner*—Joseph W. Hartary

*Attorney, Agent, or Firm*—William J. Bethurum

[57] ABSTRACT

A plastic orifice plate for an ink jet printhead and manufacturing process therefor which includes electroforming a metal die having raised sections thereon of predefined center-to-center spacings, and using the die to punch out openings in a plastic substrate of a chosen thickness to form a plurality of closely spaced orifice openings in the substrate. The orifice plate can be of a chosen transparent material and secured to a printhead substrate where the dynamics of ink flow can be viewed through the orifice plate during printhead testing and evaluation.

24 Claims, 4 Drawing Sheets

PLASTIC ORIFICE PLATE FOR AN INK JET PRINTHEAD AND METHOD OF MANUFACTURE

TECHNICAL FIELD

This invention relates generally to the manufacture of orifice plates for ink jet pens and more particularly to the manufacture of a plastic orifice plate for a thermal ink jet printhead. This orifice plate may, if desired, be made transparent in order to view fluid dynamics within the pens.

BACKGROUND ART AND RELATED APPLICATIONS

In the manufacture of disposable pens for thermal ink jet printing systems, it has been one practice to employ metal electroplating processes to form the outer ink ejection orifice plate of the pen to a desired contoured geometry. This orifice plate is also sometimes referred to as a nozzle plate, and will typically be adhesively secured to and precisely aligned with an underlying thin film resistor (TFR) substrate. In this structure, a plurality of resistive heater elements will normally be aligned with an associated plurality of ink reservoirs from which ink is ejected through orifice openings in the covering orifice plate during an ink jet printing operation. This type of thin film resistor printhead structure is described, for example, in the *Hewlett-Packard Journal*, Vol. 36, No. 5, May 1985, incorporated herein by reference.

In addition to the above HP Journal disclosure, other types of nickel orifice plates and related electroforming processes are described in U.S. Pat. No. 4,694,308 issued to C. S. Chan et al. entitled "Barrier Layer and Orifice Plate for Thermal Ink Jet Printhead Assembly", and in copending application Ser. No. 915,290 of C. S. Chan et al. entitled "Improved Barrier Layer and Orifice Plate for Thermal Ink Jet Printhead Assembly and Method of Manufacture", filed Oct. 3, 1986 now U.S. Pat. No. 4,716,423. Both the patent and the copending application are assigned to the present assignee and are incorporated herein by reference. In addition to the above disclosures, a related electroforming process for manufacturing a compound bore nickel orifice plate for an ink jet printhead is disclosed and claimed in U.S. Pat. No. 4,675,083 issued to James G. Bearss et al. on June 23, 1987, also assigned to the present assignee and incorporated herein by reference.

The metal orifice plates disclosed in the above identified references have proven highly acceptable in terms of improving ink ejection efficiency and performance and in reducing ink cavitation wear and ink corrosion, thus increasing the printhead lifetime. However, these metal orifice plates are opaque and thus do not enable one to actually view the fluid dynamics which occur beneath the orifice plate and above the associated thin film resistor substrate during an ink jet printhead testing and evaluation operation.

DISCLOSURE OF INVENTION

Accordingly, it is a general object of the present invention to provide a new and improved plastic orifice plate and process for fabricating same wherein preferred orifice geometries and spacings of the types disclosed in the above Chan et al. and Bearss et al. inventions are preserved.

Another object is to provide a new and improved transparent plastic orifice plate and process for fabricating same wherein one may view the actual fluid dynamics through the orifice plate and occurring above the printhead substrate during printhead testing and evaluation.

Another object is to provide a plastic orifice plate and related process of the type described in which durable and economical orifice plates may be reliably reproduced at high yields.

Another object is to provide a new and improved plastic orifice plate which may or may not be transparent and which is non-corrosive.

A further object is to provide a new and improved plastic orifice plate of the type described in which integral barrier layers may be formed with an outer orifice plate for subsequent attachment to a thin film resistor or equivalent energy generating substrate. Thus the requirement for providing intermediate polymer barrier layers may be eliminated and the overall printhead fabrication cost is reduced.

The above objects and attendant advantages and features of this invention are achieved by the provision of a manufacturing process which includes electroforming a metal die so as to have raised sections of a preferred contoured surface geometry which replicates the desired internal surface geometry of a plastic orifice plate. A plastic preform of a preselected thickness is then brought into physical contact with the metal die in such a manner that the raised sections of the die are punched through the plastic preform to thereby form a plurality of closely spaced and contoured orifice openings therein. When it is desired to view fluid dynamics and the like within the underlying printhead substrate, then one obviously would use a clear transparent plastic preform in the above manufacturing process.

The above summary of this invention will become better understood from the following description of the accompanying drawings.

DETAILED DESCRIPTION OF THE DRAWINGS

Figure 1A:
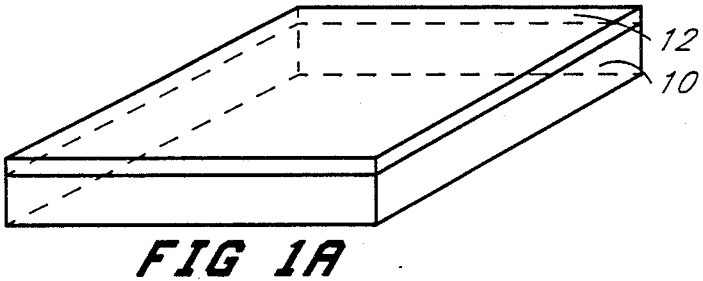
FIGS. 1A through 1H illustrate in a sequence of isometric views the various process steps which are carried out in accordance with a preferred embodiment of this invention.
Figure 1B:
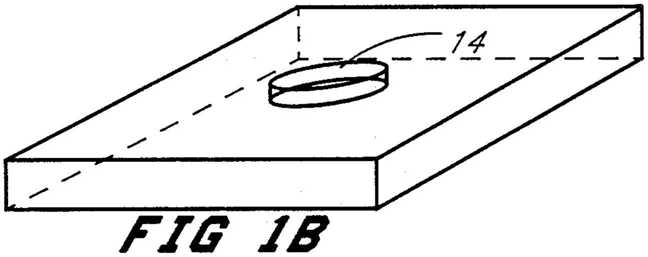
Figure 1C:
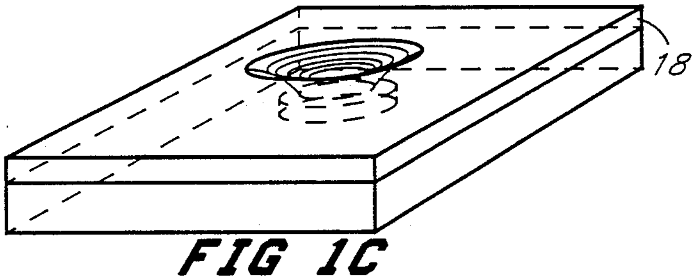
Figure 1D:
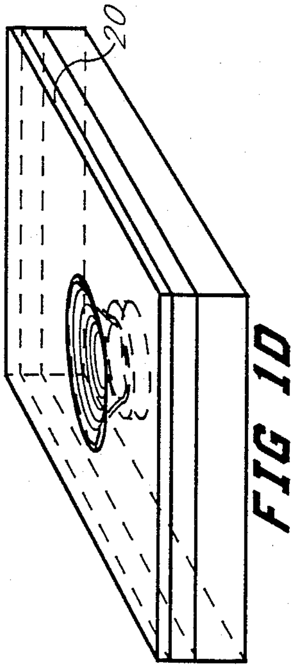
Figure 1E:
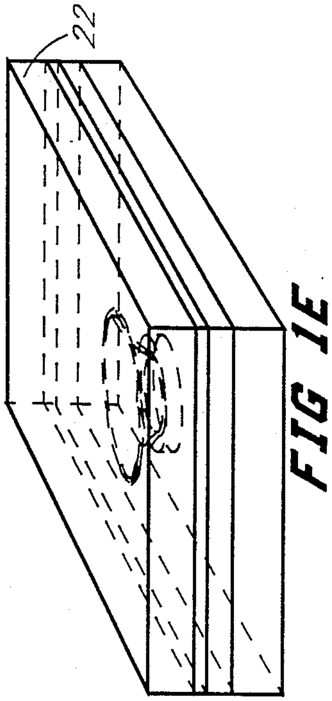
Figure 1F:
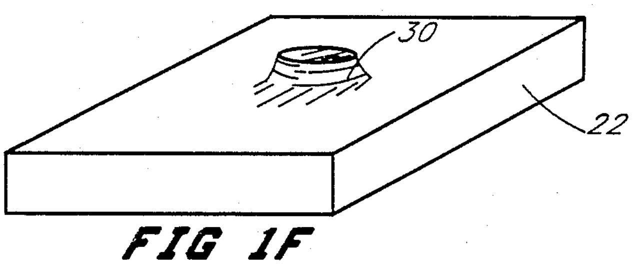
Figure 1G:
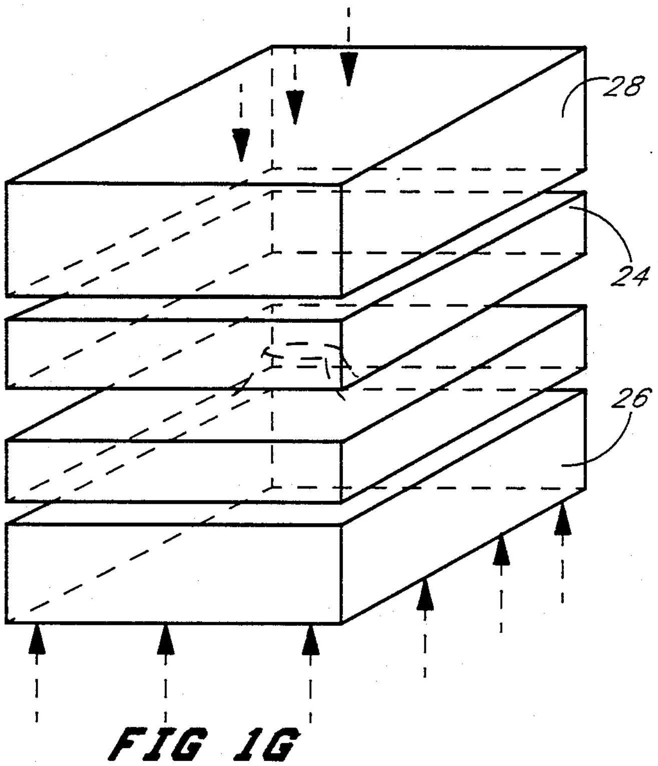
Figure 1H:
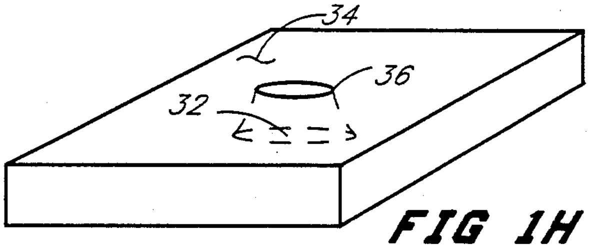
Figures 2A, 2B, 2C, 2D, 2E, 2F, 2G, 2H:
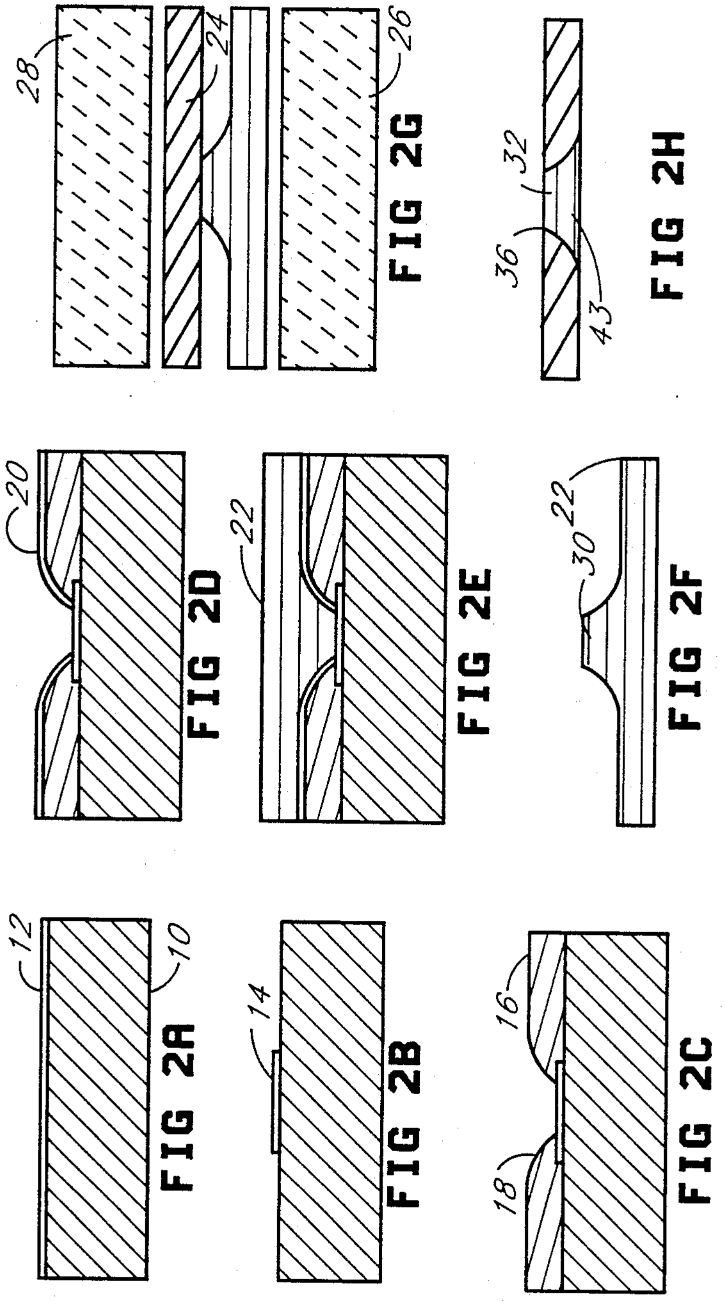
FIGS. 2A through 2H are cross section views corresponding to FIGS. 1A–1H and are taken along lines 2—2 of FIG. 1A by way of example for one set of FIGS. 1A and 2A.

Referring now to the corresponding isometric and cross section views in FIGS. 1 and 2, respectively, a stainless steel substrate 10 is coated with a thin layer of photoresist 12 in a well known manner and in accordance with teachings of the above identified Chan et al. patent or application. The photoresist 12 is then treated with conventional photolithographic masking, UV exposure and development processes to form a photoresist mask 14 which is cylindrical in shape as indicated in FIGS. 1A and 2B.

The masked structure of FIGS. 1B and 2B is then transferred to a nickel electroforming station wherein a first, surface layer 16 of nickel is formed in the geometry shown in FIGS. 3A and 3B, including a convergent orifice opening 18 which forms concentrically with the mask 14 as described in further detail in the above identified Chan et al. inventions. The use of the circular mask 14 in the manner shown enables the nickel to plate up over the outer edge of the mask and in so doing form the convergent orifice opening 18. However, it will be understood that the single opening 18 is merely representative of a plurality of openings which ultimately correspond to a plurality of orifice openings in the plastic orifice plate manufactured in accordance with the "stamp-out" or "punch-through" process described in more detail below.

The structure in FIGS. 1C and 2C is then placed in a chemical bath to remove the photoresist mask 14 and then transferred to an oven and heated to about 150° C. for approximately two hours to form a thin nickel oxide layer 20 thereon as shown in FIGS. 1D and 2D. The latter structure is then removed from the oven and taken again to the nickel electroforming station where another layer 22 of nickel is electroformed to a thickness of approximately 3 mils. This second nickel layer 22 is shown in FIGS. 1E and 2E, and the purpose of the nickel oxide layer 20 is to serve as a separation layer between the first and second nickel platings 16 and 22. The second nickel layer or plating 22 is the die for the subsequent plastic orifice plate-forming step to be described. The nickel die 22 may be easily stripped away from the underlying nickel oxide layer 20 by the use of an adhesive tape applied to both the nickel die 22 and the stainless steel substrate 10 to thereby leave the resultant die structure in the geometry indicated in FIGS. 1F and 2F.

The nickel die 22 in FIGS. 1F and 2F is then taken to a heat staker station as indicated in FIGS. 1G and 2G where it is first placed upon a thin clear transparent plastic disc 24 of approximately 2.0 mils in thickness and then inserted between two pieces of glass 26 and 28. Here heat of approximately 200° C. and pressure of approximately 120 pounds per square inch are applied to the die 22 and transparent plastic preform 24 so as to cause the contoured mesa section 30 of the die 22 to punch through the thin plastic preform 24 and thereby form the convergently contoured orifice opening 32 in the plastic preform structure shown in FIGS. 1H and 2H.

The thus formed transparent orifice plate structure 34 shown in FIGS. 1H and 2H is then placed in plasma reactor wherein the plastic surface flashing on the plastic orifice plate is removed under the following reactor conditions:

gases = CF4 and $O_2$ power = 200 watts, pressure = 0.7 Torr and time = 2 minutes.

This latter procedure will remove approximately 0.1 mil of plastic flashing material from the surface of the plastic orifice plate 34, thereby leaving a clean circular edge 36 as the output edge of the convergent orifice opening 32.

Although the clear plastic preform 24 may be easily obtained through commercial channels, this transparent substrate material was made as follows during the actual reduction to practice of this invention and therefore represents a part of the presently known best mode for carrying out the invention. First, a polycarbonate disc was provided and cut into pellets of approximately ⅛ inch cube. Then the pellets were sandwiched between two glass plates and heated to approximately 200° C. and under an applied pressure of 50 psi for about 2 minutes. This initial process yielded polycarbonate discs of 12 mils in thickness and of about 0.5 inches in diameter.

Next, the above discs were again placed between two glass plates (not shown) which were supported by 2 mil metal substrates (not shown) to control the ultimate preform thickness. Then heat of approximately 200° C. and pressure of approximately 100 psi were applied to these discs for about 2 minutes to thereby yield the final plastic preforms 24 of about 2.0 mils in thickness.

It will be course be understood that the above description of the formation of a single orifice 32 is only one of many orifices (not shown) which will be simultaneously formed in the transparent orifice plate in accordance with the number, geometry and spacing of a plurality of mesa-like sections 30 on the die 22. Thus, the present invention obviously extends to the formation of either one or a plurality of orifices 32 arranged in any desired geometry.

Additionally, the present invention is not limited to the formation of only single step convergent nozzles and may instead employ either the compound bore geometry approach disclosed in the above Bearss et al. U.S. Pat. No. 4,675,083 or alternatively the double layer nickel geometry disclosed in the above identified Chan et al. inventions in forming the die 22, or still alternatively the serrated bore orifice geometry disclosed in the now allowed U.S. application Ser. No. 121,439 of C. S. Chan et al entitled "Improved Nozzle Plate Geometry for Ink Jet Pens and Methods of Manufacture". When using the double layer nickel process to make the nickel die 22, the mesa section 30 would become a stepped double layer mesa section which could then be used to form an integral multi-layer plastic barrier layer and plastic orifice plate structure similar to the metal barrier layer and metal orifice plate structure described in the first two above identified Chan et al. inventions. In this latter alternative embodiment, the creation of the integral plastic barrier layer and orifice plate structure would make possible the elimination of well known polymer barrier layers of the prior art, such as barrier materials known in the art as RISTON and VACREL which are tradenames of the DuPont Company.

The following table of dimensions is given by way of example only:

TABLE

| Layer | Thickness | Diameter of Orifice | Center-to-Center Orifice Spacing |
|---|---|---|---|
| 16 | 2 mil | 2.0 mil | 6-7 mil |
| 20 | 1000 A | N/A | 6-7 mil |
| 22 | 2 mil | 2.0 mil | 6-7 mil |
| 34 | 2 mil | 2.0 mil | 6-7 mil |

Although the present invention is primarily directed to the processing of plastic transparent non-metallic orifice plate preforms, it is not so limited and may be used in processing any preform material which lends itself to the "punch through" die stamping operation disclosed and claimed herein.

We claim:

1. A process for forming an orifice plate for an ink jet printhead which comprises:

a. providing a metal die having raised contoured convergent mesa-shaped sections therein with predefined center-to-center spacings which define desired corresponding center-to-center spacings of orifice openings in an ink jet orifice plate, b. bringing said die into physical contact with a preform of a preselected material and thickness so that said raised sections of said die punch through said preform and thereby form contoured convergent orifice geometries therein, and c. removing said preform from said die and exposing said preform to a plasma reaction to remove flashing from the punched-formed orifice openings therein.

2. A process for forming convergent orifii in a thin layer to form an orifice plate which comprises the steps of:

a. electrodepositing a first metal layer on a substrate having a plurality of closely spaced islands thereon to leave openings in said first metal layer aligned with said islands, b. forming a second metal layer on said first metal layer and having smoothly curved convergently contoured mesas therein extending into openings in said first metal layer to form a metal die, c. separating said first and second metal layers, and d. using said second metal layer defining said metal die to stamp out opnings in a thin layer of a selected material to form convergent orifii therein.

3. The process defined in claim 2 wherein said selected material is a plastic.

4. The process defined in claim 2 wherein said selected material is a transparent plastic.

5. The process defined in claim 3 which further includes the step of exposing said plastic material having orifii therein to a plasma reaction to remove flashing from the orifice openings formed therein.

6. A process for forming a die useful in creating closely spaced convergent openings in thin layers of selected materials which comprises the steps of:

a. providing a substrate of a chosen material, b. forming islands of material adherent to the upper surface of said substrate, c. depositing a first metal layer on top of said substrate and having openings therein aligned with said islands, d. depositing a second metal layer atop said first metal layer and having smoothly curved convergent mesas extending into said openings of said first metal layer, and e. separating said first and second metal layers to thereby leave said second metal layer in the shape of a metal die having a plurality of convergently contoured mesa regions extending from one surface thereof.

7. The process defined in claim 6 wherein said metal die formed thereby is used in the formation of an orifice plate by initially aligning said metal die with a thin layer of a selected material and then punçhing said convergently contoured mesas of said metal die through said thin layer to leave convergently contoured orifii therethrough which replicate said convergently contoured mesas of said metal die.

8. The process defined in claim 7 wherein said thin layer of a selected material is a plastic.

9. The process defined in claim 7 wherein said thin layer of a selected material is a transparent plastic.

10. The process defined in claim 8 which further includes exposing said thin plastic material to a plasma reaction to remove flashing from the stamped-through orifice openings therein.

11. A process for forming a die useful for stamping convergently contoured openings in thin layers of certain chosen materials, which comprises the steps of:

a. forming a first layer of a selected material on a substrate having islands thereon of a controlled lateral extent and spacing, so that openings are formed in said first layer which are aligned with said islands, b. forming a second layer of a selected material on top of said first layer, so that smoothly curved convergently contoured mesas are formed as part of said second layer and extend into said openings in said first layer, and c. separating said first and second layers so as to leave said second layer useful as a stamp-out die.

12. The process defined claim 11 wherein said first layer is formed by electrodepositing a first metal over a substrate having islands of resist thereon, and said second layer is formed by electrodepositing a second metal over said first metal so that convergently contoured metal mesas are formed as part of said second metal and replicate the contour of openings formed in said first metal.

13. The process defined in claim 12 which further includes aligning said convergently contoured metal mesas with a thin layer of a chosen material and punching said convergently contoured metal mesas through said chosen material to form openings therein having contours which replicate the contours of said metal mesas.

14. The process defined in claim 13 wherein said chosen material is a plastic.

15. The process defined in claim 13 wherein said chosen material is a transparent plastic.

16. The process defined in claim 12 wherein the formation of said first and second metals includes electrodepositing nickel to form first and second layers of nickel, and said process further includes providing an intermediate step of forming a thin nickel oxide layer on said first layer of nickel and between said nickel layers in order to facilitate separation of said nickel layers after a nickel die is completed.

17. The process defined in claim 16 which further includes aligning said convergently contoured metal mesas with a thin layer of a chosen material, and punching said convergently contoured metal mesas through said chosen material to form openings therein having contours which replicate the contours of said metal mesas.

18. The process defined in claim 17 wherein said chosen material is a plastic.

19. The process defined in claim 17 wherein said chosen material is a transparent plastic.

20. The process defined in claim 18 which further includes exposing said thin plastic material to a plasma reaction to remove flashing from the stamped-through orifice openings therein.

21. A metal die useful in the manufacture of orifice plates and comprising a metal substrate having a plurality of smoothly and convergently contoured mesa regions extending therefrom and spaced apart by a predefined distance.

22. The die defined in claim 21 wherein said mesa regions are uniformly spaced on said substrate with center-to-center spacings on the order of 6–7 mils.

23. The die defined claim 22 wherein said substrate and mesa regions extending therefrom are electroformed nickel.

24. The die defined in claim 23 wherein said mesa regions are formed of nickel electrodeposited on an underlying metal layer having openings therein which are aligned with spaced islands formed on a reusable dummy substrate.

* * * * *